(12) United States Patent
Lalancette

(10) Patent No.: US 6,979,780 B1
(45) Date of Patent: Dec. 27, 2005

(54) NON-GANGABLE BOX WITH EMBOSSED SIDES

(75) Inventor: Daniel Lalancette, L'Acadie (CA)

(73) Assignee: Thomas & Betts, International, Inc., Wilmington, DE (US)

( * ) Notice: Subject to any disclaimer, the term of this patent is extended or adjusted under 35 U.S.C. 154(b) by 0 days.

(21) Appl. No.: 11/137,822

(22) Filed: May 25, 2005

Related U.S. Application Data

(60) Provisional application No. 60/618,416, filed on Oct. 13, 2004.

(51) Int. Cl.$^7$ ................................................ H02G 3/08

(52) U.S. Cl. .................... 174/50; 174/58; 174/60; 174/63; 174/64; 248/906; 439/535

(58) Field of Search .................... 174/50, 58, 60, 174/63, 64, 66, 67; 220/3.8, 3.9, 4.02; 248/906; 439/535

(56) References Cited

U.S. PATENT DOCUMENTS

| | | | |
|---|---|---|---|
| 2,757,817 A | 8/1956 | Egan | |
| 2,879,912 A | 3/1959 | Appleton | |
| 3,816,638 A | 6/1974 | Appleton | |
| 4,842,156 A | 6/1989 | Nattel | |
| 5,579,939 A | 12/1996 | Bourassa | |
| 5,744,753 A * | 4/1998 | Nattel | ........................ 174/58 |
| 6,715,625 B2 | 4/2004 | MacDonald | |

* cited by examiner

*Primary Examiner*—Dhiru R. Patel
(74) *Attorney, Agent, or Firm*—Hoffmann & Baron, LLP

(57) ABSTRACT

A non-gangable electrical outlet box which includes a pair of side walls with raised portions on the exterior surfaces. The raised portions have a pair of holding prongs, a pair of positioning tabs and at least one depression having a bottom surface and an aperture. The bottom surface of the depression is angularly disposed to the raised portion to facilitate insertion of a screw in the aperture though the front opening of the outlet box. The top wall, the bottom wall and the side walls are attached to each other and to the rear wall with at least one weld to form the outlet box.

15 Claims, 5 Drawing Sheets

NON-GANGABLE BOX WITH EMBOSSED SIDES

This application claims priority from provisional application Ser. No. 60/618,416, filed on Oct. 13, 2004.

BACKGROUND OF THE INVENTION

The present invention relates to an electrical outlet box, more specifically to an electrical outlet box for housing wiring connections and/or electrical devices with embossed side walls which provide additional space within the box.

Electrical outlet boxes are commonly used as junction boxes for connecting wires or for housing and connecting a switch, an electrical receptacle or other type of electrical device. Outlet boxes are typically attached to a wood or metal wall stud. Most outlet boxes of the prior art have a rectangular shape and have an opening next to the stud. An aperture is cut in the outer wall covering in order to access the inside of the outlet box. The outlet box must be properly positioned in relation to the stud and the outer covering, such as wall board or sheetrock, which is later placed over the stud. The outer wall covering placed on the stud is a gypsum board material or wood panel with a thickness of from ¼ to 1 inch. Therefore, the outlet box must be positioned so that it extends through the outer covering to allow the outlet box to be accessed.

Electrical outlet boxes can be made in one of two different ways. The first design is a modular design, wherein the four side walls and back wall of the open-front box are fastened together using bolts or screws. These types of boxes are called "gangable electrical outlet boxes." The sides are fastened together, either by the consumer or by the manufacturer, before the box is installed.

One problem with gangable boxes is that, since they are constructed using various bolts/screws, the bolts/screws holding the box together can loosen and compromise the integrity of the electrical outlet box. Another problem with gangable boxes is the considerable time and effort required for the user to properly assemble the outlet boxes.

A second type of electrical outlet box design is called a "non-gangable outlet box." This type of box is welded together using a bead weld or a tackweld at various points where the walls adjoin. Although non-gangable boxes solve some problems associated with gangable boxes, there are additional problems encountered when using non-gangable boxes.

One problem with non-gangable boxes is that the interior space of typical non-gangable electrical outlet boxes is limited. Non-gangable outlet boxes typically have a rear wall and four flat side walls extending therefrom to create a rectangular box. The interior space of these non-gangable boxes is limited and it can be difficult for the user to connect wires or an electrical device in the outlet box. Another problem with non-gangable boxes is that, typically, there are no features on the box which assist the user in positioning the box on the structural support before it is permanently mounted.

Accordingly, it is desirable to provide an outlet box which facilitates the attachment of the box to a support. There is also a need for an outlet box which has sufficient interior space to allow a user to easily connect wires to electrical devices housed in the box. There is a further need for an electrical outlet box which is rigidly constructed and eliminates unnecessary assembly time prior to installation.

SUMMARY OF THE INVENTION

The present invention relates to a non-gangable electrical outlet box that includes: a substantially flat rear wall having an outer perimeter defined by a first and second pair of opposing edges; a pair of side walls extending substantially perpendicularly from the first pair of opposing edges; a top wall and a bottom wall extending substantially perpendicular from the second pair of opposing edges and adjoining the pair of side walls; a pair of positioning tabs extending outwardly from one of the pair of side walls; a first holding prong extending from one of the side walls; and at least one depression having a bottom surface in the raised portion, wherein the bottom surface has an aperture and is preferably angularly disposed to the raised portion to facilitate insertion of a screw in the aperture though the opening. The top wall and the bottom wall are attached to the pair of side walls and all four walls are attached to the rear wall with at least one weld at each point of attachment to form the outlet box. In addition, the top wall, the bottom wall and the pair of side walls have exterior surfaces and terminate to form a rim that defines an opening in the outlet box.

A first side wall of the pair of side walls includes a first raised portion on the exterior surface. Preferably, the first raised portion of the non-gangable outlet box forms a substantially flat surface having a length and a width and the first holding prong extends from the surface. The non-gangable outlet box can also include a second holding prong extending from the first raised portion. The second side wall of the pair of side walls can include a second raised portion which forms a substantially flat surface having a length and a width.

The two positioning tabs can be recessed an equidistance from the rim. The distance can vary and is selected based on the thickness of the wall covering that is attached to the structural wall supports. After the wall covering is installed, the rim is adapted to receive a cover plate. A portion of each of the pair of side walls can extend beyond the top wall and the bottom wall. In preferred embodiments, the positioning tabs extend from this portion of one of the pair of side walls. The portion of each of the side walls can also include one or more mounting apertures that can be used for securing the outlet box to a structural support.

Another embodiment of the non-gangable electrical outlet box includes: a substantially flat rear wall; a pair of side walls; a top wall and a bottom wall; a pair of positioning tabs extending outwardly from one of the pair of side walls, wherein the tabs are recessed from the rim; and at least one depression having a bottom surface formed in the raised portion. The bottom surface has an aperture and is angularly disposed to the first raised portion to facilitate insertion of a screw in the aperture though the opening in the outlet box. The top wall and the bottom wall are connected to the pair of side walls and all four walls are attached to the rear wall with at least one weld at each connecting/attachment point to form the outlet box.

The top wall, the bottom wall and the pair of side walls have exterior surfaces and terminate to form a rim that defines an opening in the outlet box. A first side wall of the pair of side walls includes a first raised portion on the exterior surface. The non-gangable outlet box can also include a pair of holding prongs extending from the first raised portion. In addition, a second side wall of the pair of side walls can include a second raised portion and a portion of each of the pair of side walls can extend beyond the top wall and the bottom wall. Preferably, the positioning tabs extend from the portion of one of the pair of side walls.

Another preferred embodiment of the non-gangable electrical outlet box includes: a substantially flat rear wall; a pair of side walls; a top wall and a bottom wall. The top wall, the bottom wall and the pair of side walls are interconnected and are secured to the rear wall with at least one weld at each connection point to form the outlet box. The top wall, the bottom wall and the pair of side walls have exterior surfaces and terminate to form a rim that defines an opening in the outlet box and each of the side walls includes a raised portion on the exterior surfaces.

The outlet box also includes a pair of holding prongs extending from the raised portions; a pair of positioning tabs extending outwardly from one of the pair of side walls; and at least one depression having a bottom surface formed in the raised portion of at least one of the pair of side walls. The bottom surface of the depression has an aperture and is angularly disposed to the raised portion to facilitate insertion of a screw in the aperture though the opening. Preferably, the positioning tabs are recessed from the rim, and a portion of each of the side walls extends beyond the top wall and the bottom wall so that the positioning tabs extend from the portion of one of the pair of side walls.

The preferred embodiments of the electrical outlet box of the present invention, as well as other objects, features and advantages of this invention, will be apparent from the following detailed description, which is to be read in conjunction with the accompanying drawings.

BRIEF DESCRIPTION OF THE DRAWINGS

Other objects and many attendant features of this invention will be readily appreciated as the invention becomes better understood by reference to the following detailed description when considered in connection with the accompanying drawings wherein.

DETAILED DESCRIPTION OF THE PREFERRED EMBODIMENT

Figure 1:
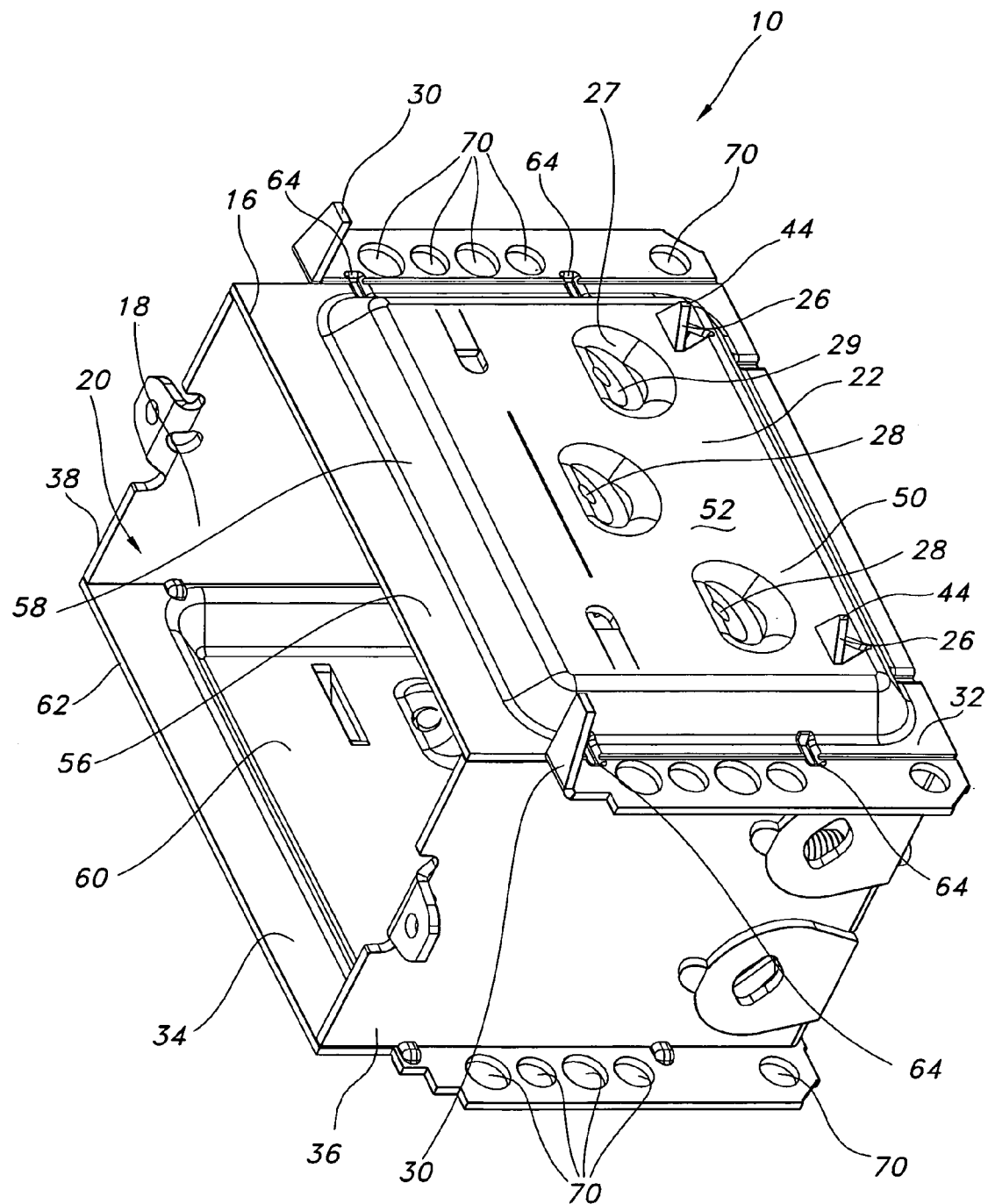
FIG. 1 is a right side perspective view of the outlet box of the present invention.

The outlet box of the present invention provides a housing with embossed side walls which provide addition space within the box for electrical outlets, switches and the termination of electrical wiring. The housing is easily securable to a structural support, such as a stud, which allows for the quick and efficient installation of the outlet box.

In a preferred embodiment, the outlet box has four individual walls which form a rectangular box. However, it is envisioned that any shape outlet box can be configured. The outlet box can be made of a metal such as steel or aluminum, or a high strength plastic can also be used.

Referring to FIGS. 1–6, outlet box 10 has a substantially flat, rectangular rear wall 12 (FIG. 6) with a pair of side walls 32, 34, a bottom wall 36 and a top wall 38 extending from the edges of the rear wall 12 and terminating at a rim 16 that defines an opening 18 in the outlet box 10. The pair of side walls 32, 34, the bottom wall 36 and the top wall 38 together with the rear wall 12 form the outlet box 10 with an interior 20. The outlet box 10 further includes a mounting surface 22 on the side wall 32 that is generally planar and is adapted to abut against a structural support. Mounting surface 22 can include one or more prongs 26 that can engage the structural support for holding the outlet box 10 to the structural support. The mounting surface 22 can also include one or more apertures 28 that are adapted to receive a fastener (not shown) for operatively securing the outlet box 10 to a structural support. Preferably, the apertures 28 are located in the bottom surfaces 29 of depressions 27 in the mounting surface 22. In the most preferred embodiments, the bottom surfaces 29 are angularly disposed to the mounting surface 22 so that a user can easily insert a mounting screw or nail through the aperture 28 via the opening 18 in the outlet box 10.

Figure 3:
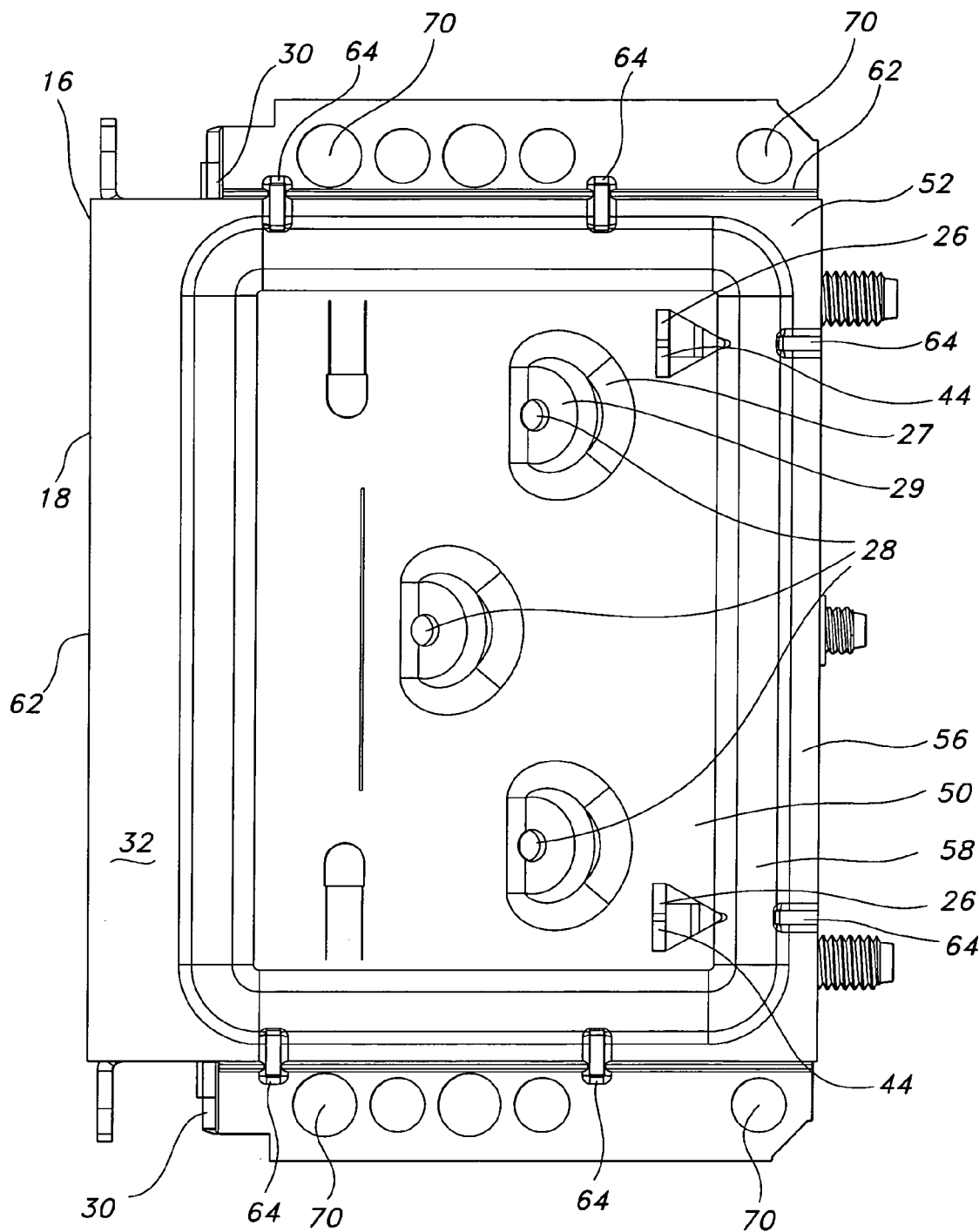
FIG. 3 is a right side elevational view of the outlet box as shown in FIG. 1.

Referring specifically to FIGS. 1 and 3, side wall 32 has at least one positioning tab 30 extending substantially perpendicularly therefrom. In a preferred embodiment, there are two positioning tabs 30 which may be substantially rectangular in shape. The positioning tabs 30 assist in positioning the outlet box 10 on the structural support. The positioning tabs 30 are recessed a predetermined distance from the rim 16, which is approximately equal to the thickness of the wall covering. The distance that the positioning tabs 30 are recessed can vary in order to accommodate wall coverings of different thicknesses. This allows the opening 18 of the outlet box 10 to be placed in the proper position in relation to the support and the wall covering. When the outlet box 10 is attached to a structural support with the mounting surface 22 flush with the side of the support and the positioning tabs 30 positioned on the front face of the support, the outlet box rim 16 projects beyond the front surface of the support and through the outer wall covering. The positioning tabs 30 permit an installer to correctly position and align the outlet box 10 in relation to the support and the wall covering.

The pair of side walls 32, 34, the bottom wall 36, the top wall 38 and the rear wall 12 can all be fastened to each other using tackwelds 64 or a bead weld. Outlet boxes held together using welds, and not screws or any other fastening means, are commonly known as non-gangable boxes. Methods used for welding gangable boxes are well known in the art and any of these methods can be used to fabricate the gangable boxes of the present invention.

Figure 2:
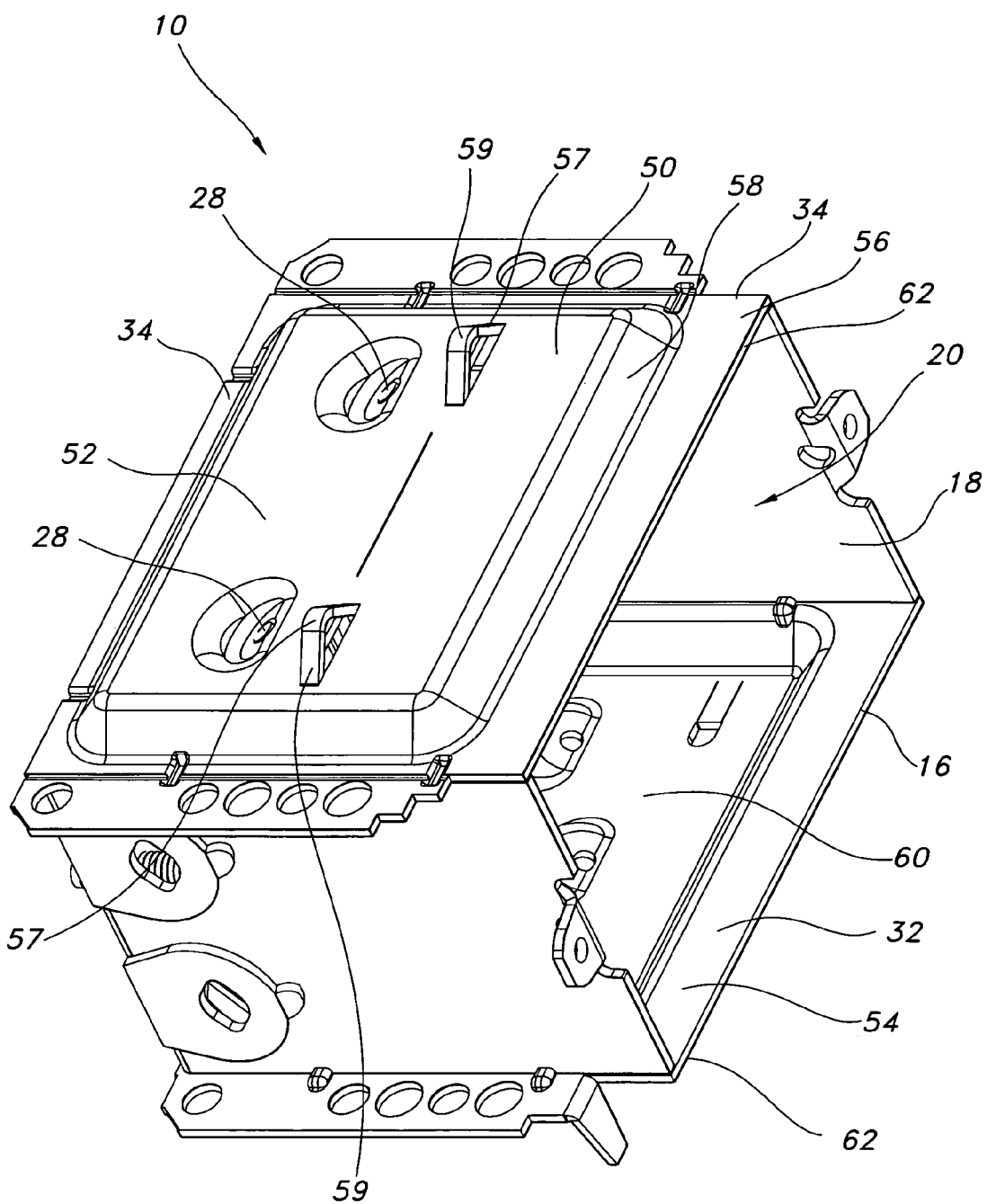
FIG. 2 is a left side perspective view of the outlet box of FIG. 1.

Referring to FIGS. 1–3, the side wall 32 has a raised mounting surface 22 that can be formed by any of a number of methods that are well known to one skilled in the art, including stamping, embossing, or drawing. The side wall 32 has an outer surface 52 and an inside surface 54 which forms part of the interior 20 of the box 10. The side wall 32 has an outer perimeter 62. The outer perimeter 62 is formed by a lower portion 56. A curved connecting portion 58 connects the lower portion 56 to the raised portion 50. The raised portion 50 can have a rectangular shape or any other configuration as needed. Since the raised portion 50 extends outwardly from the lower portion 56, a depression 60 is created on the inside surface 54 of the first wall 32. The depression 60 provides an outlet box 10 with a larger interior 20, which can be used for extra wires and larger devices. The outer surface 52 of the raised portion 50 preferably contacts a surface of a support. The raised portion 50 results in the outlet box opening 18 being positioned a predetermined distance from the support based on the height of the raised portion 50 from the lower portion 56. The raised portion 50 can include at least one holding prong 26 extending therefrom.

In order to quickly and easily secure the outlet box 10 to the structural support, the outlet box 10 includes at least one mounting aperture or hole 28. In preferred embodiments, the aperture 28 is formed on the bottom surface 29 of a depression 27 in the raised portion 50. The bottom surface 29 is angularly disposed to the raised portion 50 so that the inside surface 54 is accessible through the opening 18 in the outlet box 10. This facilitates securing the outlet box 10 to the support using either nails or screws.

Holding prongs 26 temporarily secure the outlet box 10 in place while the user fastens the outlet box 10 on the structural support. In a preferred embodiment, there are two holding prongs 26 extending from the mounting surface 22. Referring back to FIGS. 1 and 3, holding prongs 26 may have pointed tips 44 which are used to pierce a wooden support. Typically, the holding prongs 26 are spaced a distance from each other. In an alternative embodiment (not shown), the holding prongs 26 are positioned at opposite corners of the raised portion 50.

Figure 4:
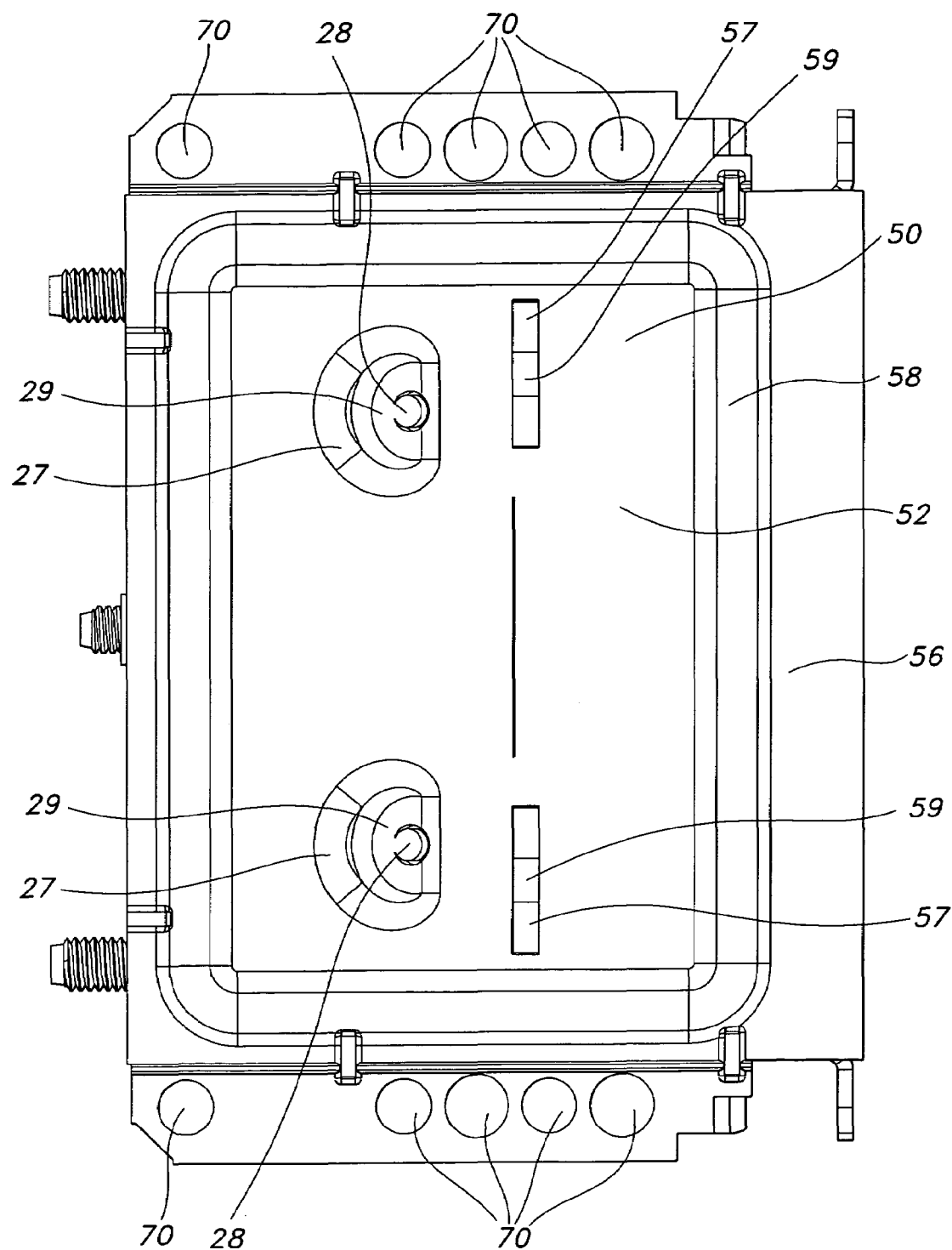
FIG. 4 is a left side elevational view of the outlet box of FIG. 1.
Figure 5:
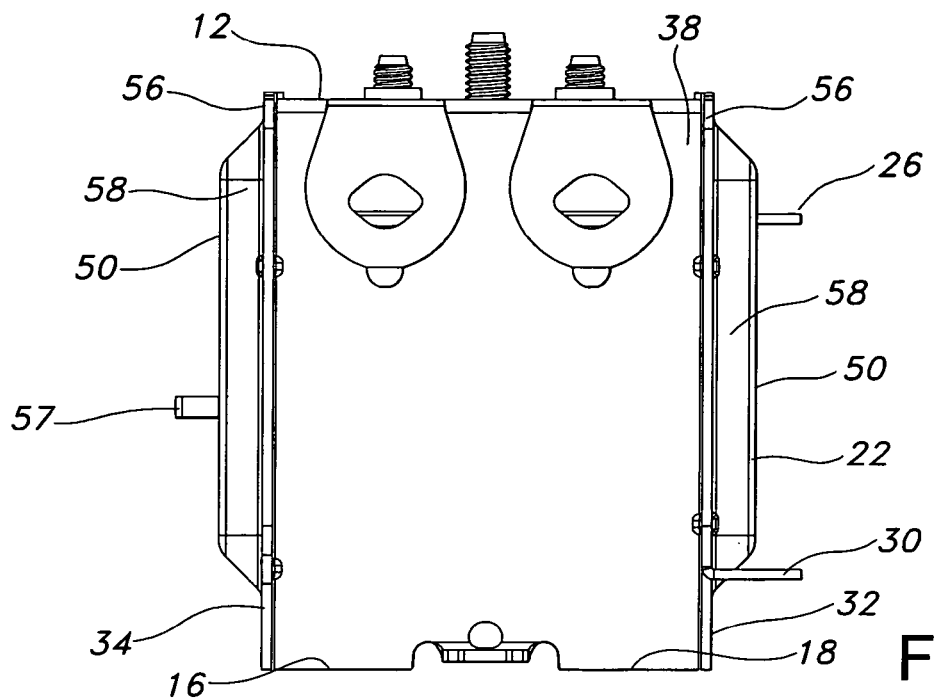
FIG. 5 is a top plan view of the outlet box as shown in FIG. 1 with the bottom being a mirror image thereof.
Figure 6:
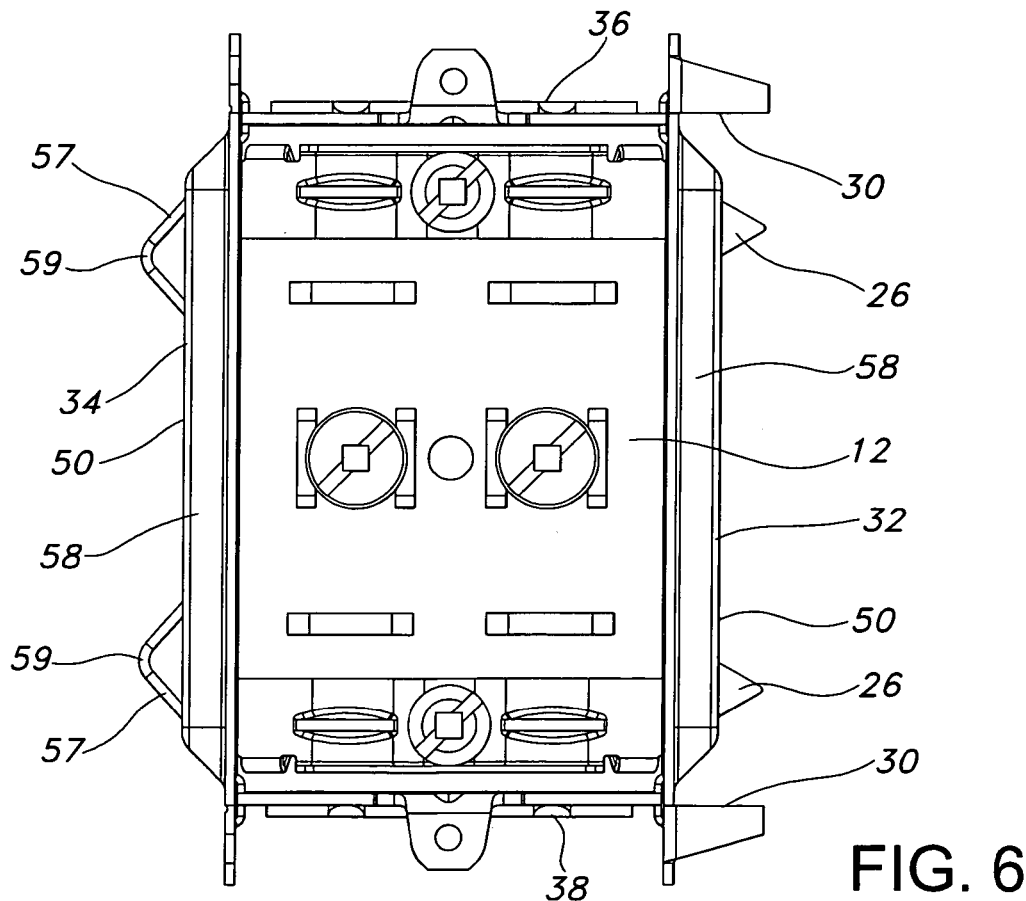
FIG. 6 is a front elevational view of the outlet box of FIG. 1.

Referring to FIGS. 1, 2 and 4 the second side wall 34 is similar in construction to the first side wall 32. The second side wall 34 can have the same configuration for the lower portion 56; connecting portion 58; raised portion 50; depression 60; inner surface 54; outer surface 52; and outer perimeter 62 as the first side wall 32. The second side wall 34 does not have any positioning tabs. However, it is within the contemplation of the invention in an alternative embodiment for the second side wall 34 to have positioning tabs. There can be at least one aperture 28 in the side wall 34. An alternative embodiment of holding prongs 57 is shown. The holding prongs 57 are shown to have a blunted tip 59.

In order to mount the box 10, the user first aligns the positioning tabs 30 so that they are flush with the front face of a structural support, such as a wood stud, and the mounting surface 22 abuts the side surface of the support. The tabs 30 are positioned flush so that the outlet box opening 18 projects outwardly from the structural support. A wall covering with a hole can be placed over the outlet box opening 18 so that the rim 16 of the outlet box 10 projects through the hole.

After the outlet box 10 is positioned on the structural support, the user taps the side of the outlet box 10 opposite the support so that the holding prongs 26 which project out of the raised portion 50 of the outlet box 10 pierce the structural support. The holding prongs 26 frictionally engage the structural support and maintain the outlet box 10 in position while the user completes the installation by securing the outlet box 10 to the support with screws or nails through at least one aperture 28. The outlet box 10 is held onto the structural support by both holding prongs 26 which prevents pivoting of the outlet box 10. The outlet box 10 is further prevented from moving by the two positioning tabs 30 which engage the front face of the support (not shown) and prevent movement of the box 10.

Although, holding prongs 26 hold the outlet box 10 to the structural support, fasteners, such as screws or nails, are used so that the outlet box 10 is permanently secured to the support. The use of one or more fasteners allows the outlet box 10 to be held securely to the structural support and retain fixtures, such as switches, without shifting position during use.

A further advantage the positioning tabs 30 and the holding prongs 26 is that they makes it easy for anyone to properly position the outlet box 10 onto a structural support without extensive training or measuring. The use of only one screw when used in conjunction with the pair of holding prongs 26 has been found to properly secure an outlet box 10 to a stud in compliance with applicable building codes, such as the CSA 10 standard, without the need for additional fasteners. This means less hardware and time is needed to properly attach the outlet box 10, which reduces the cost of the installation. However, multiple fasteners and apertures 28 may be used as needed.

Although preferred embodiments of the present invention have been described herein with reference to the accompanying drawings, it is to be understood that the invention is not limited to those precise embodiments and the various other changes and modifications may be effected herein by one skilled in the art without departing from the scope or spirit of the invention, and that it is intended to claim all such changes and modifications that fall within the scope of the invention.

We claim:

1. A non-gangable electrical outlet box comprising:
    a substantially flat rear wall having an outer perimeter defined by a first and second pair of opposing edges;
    a pair of side walls extending substantially perpendicularly from the first pair of opposing edges;
    a top wall and a bottom wall extending substantially perpendicular from the second pair of opposing edges and adjoining said pair of side walls;
    wherein said top wall and said bottom wall are attached to said pair of side walls and all four walls are attached to said rear wall utilizing at least one weld to form said outlet box, wherein said top wall, said bottom wall and said side walls have exterior surfaces and terminate to form a rim that defines an opening in said outlet box, and wherein a first side wall of said pair of side walls includes a first raised portion on said exterior surface;
    a pair of positioning tabs extending outwardly from one of said pair of side walls, wherein said tabs are recessed from said rim;
    a first holding prong extending from said first raised portion; and
    at least one depression having a bottom surface in said raised portion, wherein said bottom surface has an aperture.

2. The non-gangable outlet box according to claim 1, wherein said first raised portion forms a substantially flat surface having a length and a width.

3. The non-gangable outlet box according to claim 1, further comprising a second holding prong extending from said first raised portion.

4. The non-gangable outlet box according to claim 3, wherein said bottom surface of said at least one depression is angularly disposed to said first raised portion to facilitate insertion of a screw in said aperture though said opening.

5. The non-gangable outlet box according to claim 1, wherein a second side wall of said pair of side walls includes a second raised portion, said second raised portion forming a substantially flat surface having a length and a width.

6. The non-gangable outlet box according to claim 1, wherein said positioning tabs are equidistant from said rim.

7. The non-gangable outlet box according to claim 1, wherein a portion of each of said pair of side walls extends beyond said top wall and said bottom wall.

8. The non-gangable outlet box according to claim 7, wherein said positioning tabs extend from said portion of one of said pair of side walls.

9. The non-gangable outlet box according to claim 7, wherein said portion of each of said pair of side walls includes one or more mounting apertures.

10. The non-gangable outlet box according to claim 1, wherein said rim is adapted to receive a cover plate.

11. A non-gangable electrical outlet box comprising:
a substantially flat rear wall;
a pair of side walls;
a top wall and a bottom wall, wherein said top wall and said bottom wall are connected to said pair of side walls and all four walls are attached to said rear wall by at least one weld to form said outlet box, wherein said top wall, said bottom wall and said side walls have exterior surfaces and terminate to form a rim that defines an opening in said outlet box, and wherein a first side wall of said pair of side walls includes a first raised portion on said exterior surface;
a pair of positioning tabs extending outwardly from one of said side walls, wherein said tabs are recessed from said rim; and
at least one depression having a bottom surface formed in said raised portion, wherein said bottom surface has an aperture and wherein said bottom surface is angularly disposed to said first raised portion to facilitate insertion of a screw in said aperture though said opening.

12. The non-gangable outlet box according to claim 11 further comprising a pair of holding prongs extending from said first raised portion.

13. The non-gangable outlet box according to claim 11, wherein a second side wall of said pair of side walls includes a second raised portion.

14. The non-gangable outlet box according to claim 11, wherein a portion of each of said side walls extends beyond said top wall and said bottom wall and wherein said positioning tabs extend from said portion of one of said side walls.

15. A non-gangable electrical outlet box comprising:
a substantially flat rear wall;
a pair of side walls;
a top wall and a bottom wall, wherein said top wall, said bottom wall and said side walls are interconnected and are secured to said rear wall with at least one weld to form said outlet box, wherein said top wall, said bottom wall and said side walls have exterior surfaces and terminate to form a rim that defines an opening in said outlet box, and wherein each of said side walls includes a raised portion on said exterior surfaces;
a pair of holding prongs extending from said raised portions;
a pair of positioning tabs extending outwardly from one of said side walls, wherein said tabs are recessed from said rim, wherein a portion of each side wall extends beyond said top wall and said bottom wall and wherein said positioning tabs extend from said portion of one of said side walls; and
at least one depression having a bottom surface formed in said raised portion of at least one of said side walls, wherein said bottom surface has an aperture and wherein said bottom surface is angularly disposed to said raised portion to facilitate insertion of a screw in said aperture though said opening.

* * * * *

UNITED STATES PATENT AND TRADEMARK OFFICE
CERTIFICATE OF CORRECTION

PATENT NO.        : 6,979,780 B1                                    Page 1 of 1
APPLICATION NO.   : 11/137822
DATED             : December 27, 2005
INVENTOR(S)       : Daniel Lalancette It is certified that error appears in the above-identified patent and that said Letters Patent is hereby corrected as shown below:

Column 2, line 52,    now reads: "screw in the aperture though the opening in the outlet box."

should read: "screw in the aperture through the opening in the outlet box."

Column 3, line 18,    now reads: "of a screw in the aperture though the opening. Preferably, the"

should read "of a screw in the aperture through the opening. Preferably, the"

Column 7, line 20,    now reads: "tion of a screw in said aperture though said opening."

should read: "tion of a screw in said aperture through said opening."

Column 8, line 28,    now reads: "said aperture though said opening."

should read: "said aperture through said opening."

Signed and Sealed this

Twenty-ninth Day of August, 2006

JON W. DUDAS
*Director of the United States Patent and Trademark Office*